A. WINGARD.
Paddle-Wheel.

No. 204,180.   Patented May 28, 1878.

Witnesses
W. H. Clark
J. V. De Vry

Inventor
Adam Wingard
by Jno. L. Boone
his Attorney

UNITED STATES PATENT OFFICE.

ADAM WINGARD, OF SAN FRANCISCO, CALIFORNIA.

IMPROVEMENT IN PADDLE-WHEELS.

Specification forming part of Letters Patent No. 204,180, dated May 28, 1878; application filed March 26, 1878.

*To all whom it may concern:*

Be it known that I, ADAM WINGARD, of the city and county of San Francisco, in the State of California, have invented an Improved Paddle-Wheel; and I do hereby declare that the following is a full, clear, and exact description thereof, reference being had to certain drawings accompanying this specification, and forming a part thereof.

My invention relates to paddle-wheels for steam-vessels; and consists of a peculiar conformation and arrangement of the buckets or floats, whereby I obtain a sculling or fish-tail action of the buckets upon the water.

Various devices and arrangements have been attempted for producing a fish-tail action in connection with a paddle-wheel, such as constructing the buckets or floats in an X or V form; but all are objectionable, as far as I have been able to learn, on account of the failure of these devices to take proper hold upon the water.

My invention consists of two circular rims or blades, one of which is secured to each edge of the wheel-rim, so that it projects from the wheel all around its circumference. The projecting portions of these rims or blades I crimp or bend at regular intervals in opposite directions, so that the edges of the inward-bent portions of the two blades are opposite each other, and meet midway between the two sides of the wheel, while the outward bent or crimped portions form lip-like projections on each side of the wheel. The crimps are opposite each other, as stated, so that a series of flaring or mouth-shaped openings or cavities are formed, which alternate with the inward-crimped portions, all as hereinafter more fully described.

Figure 1:
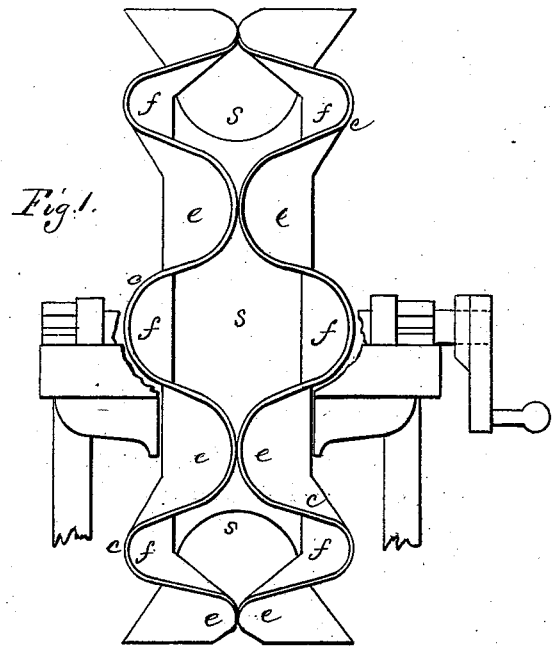
Figure 2:
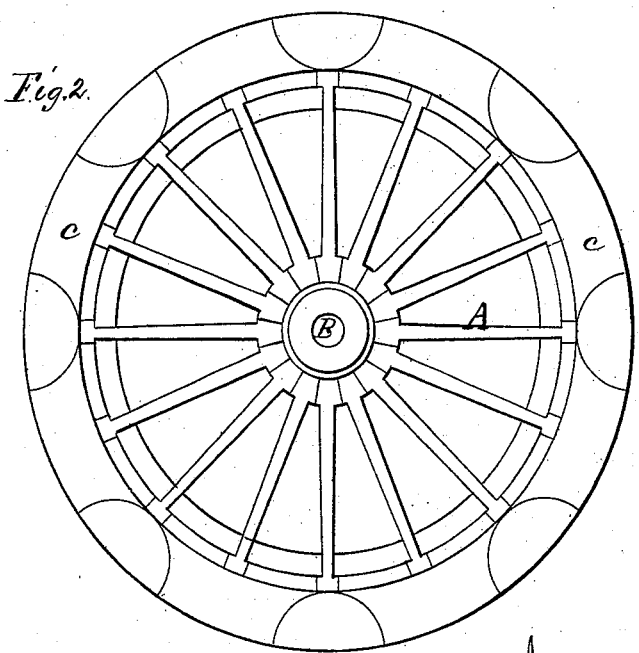

Referring to the accompanying drawings, Figure 1 is an edge view of the rim of the wheel. Fig. 2 is a side view, showing skeleton-frame.

Let A represent a wheel, which, in the present instance, is represented as being solid; but in some instances it will be made open in the manner of a spoke or skeleton wheel, as hereinafter more fully stated. This wheel is mounted upon a driving-shaft, B.

To the periphery of the wheel A, on each side, I secure a circular rim or blade, c. The inner edge of each rim or blade is plain, so that it can be easily fitted against and secured to the side of the wheel-rim, while the outer or projecting portion is alternately bent or crimped in opposite directions at regular intervals. The inward bent or crimped portion e of the two opposite rims meet midway between the sides of the wheel, as represented, while the outwardly bent or crimped portion f forms lip-like projections on each side.

This arrangement provides a series of mouth-shaped openings or buckets, while the intervening inward bends or crimps form arches or bridges over the rim or face of the wheel A. This rim or face I gouge or hollow out, so as to form a concave channel, s, extending entirely around the wheel, thus providing a throat or passage of considerable size underneath each arch or bridge, which connects the line of mouth-shaped buckets. The outer edge of each rim or blade c will then be serpentine, as shown.

This provides a peculiar shaped bucket, which presents a continually-changing angle of surfaces, both inside and outside, to act upon the water when the wheel is in motion.

The widened or flaring mouth-shaped buckets will receive a larger quantity of water than can readily pass through the throats under the bridges, so that the water is condensed in the throats as long as the wheel is in the water under motion. As the wheel moves, the opposite inside surfaces of the submerged buckets receive the pressure, and the water closes over the submerged bridges, thus presenting a constantly-shifting pulling-surface, which acts to and from the middle line of the buckets or wheel-rim, like the motion of a scull-oar or fish-tail. The water which is condensed in the submerged throat discharges through the throat into the next bucket as it rises above the surface of the water, thus maintaining the action as long as the wheel rotates.

The solid wheel, represented by A, is especially adapted as a stern-wheel for a river-boat or for propelling a vessel on comparatively calm waters; but for an ocean vessel where large waves are to be encountered, I provide a spoke or skeleton wheel, because it offers less resistance to side or quartering waves. In this case I provide a concave face for the wheel, which is preferably made of sheet metal.

A wheel of this construction, half as wide as an ordinary paddle-wheel, has a large area of acting-surface to come in contact with the water, so that I am able to reduce the width of the wheel-houses and guards of the vessel to half their usual size without sacrificing any of the effectiveness of the wheel. This alone is an important item. Again, the conformation of the wheel is such that the opening in the guards in which it moves can be built close up to its sides and buckets, so that no water will be carried above the line of the shaft, thus permitting the engineer to pass around the wheel for the purpose of oiling the bearings or perform other work while it is in operation.

It will be noticed that the buckets enter and emerge from the water edgewise, so that they produce no jar or concussion. Each flaring mouth-shaped bucket will receive and admit a larger amount of water than can pass through the throat back of it, so that the water is condensed in the throat, and acts like a solid bucket as long as the bucket moves in the water; but as soon as it emerges the water is at once discharged, so that there is no lifting of the water by the rising buckets.

This wheel is also adapted for operating in waters in which ice is floating, as its great strength and peculiar form render it practically proof from injury should it come in contact with floating cakes of ice.

Having thus described my invention, what I claim, and desire to secure by Letters Patent, is—

The paddle-wheel A, provided with two projecting rims or blades, $c\ c$, one of which is secured to the periphery of the wheel on each side, the projecting portion of each blade being alternately bent in opposite directions, so as to form alternate arches or bridges $e$, and flaring or mouth-shaped cavities or buckets $f$, substantially as and for the purpose above described.

In witness whereof I have hereunto set my hand and seal.

ADAM WINGARD. [L. S.]

Witnesses:
  J. V. DE VRY,
  WILL V. SCHWARTZ.